United States Patent
Selvaraj et al.

(10) Patent No.: US 10,293,830 B2
(45) Date of Patent: May 21, 2019

(54) SYSTEMS AND METHODS FOR RECOGNIZING AND ANALYZING EMOTIONAL STATES OF A VEHICLE OPERATOR

(71) Applicant: Honeywell International Inc., Morris Plains, NJ (US)

(72) Inventors: JeevananthaRaja Selvaraj, Theni (IN); Kirupakar Janakiraman, Tamil Nadu (IN); Rajesh Vikraman, Kerala (IN); Muralidharan Jagannathan, Tamil Nadu (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/345,416

(22) Filed: Nov. 7, 2016

(65) Prior Publication Data
US 2018/0126999 A1 May 10, 2018

(51) Int. Cl.
*B60W 40/08* (2012.01)
*B60W 50/14* (2012.01)
*G08B 21/02* (2006.01)

(52) U.S. Cl.
CPC ............ *B60W 40/08* (2013.01); *B60W 50/14* (2013.01); *G08B 21/02* (2013.01); *B60W 2040/0872* (2013.01); *B60W 2050/143* (2013.01); *B60W 2540/22* (2013.01)

(58) Field of Classification Search
None
See application file for complete search history.

(56) References Cited

U.S. PATENT DOCUMENTS

| | | | |
|---|---|---|---|
| 7,211,706 B2 | 5/2007 | Gauthier et al. | |
| 8,866,623 B2 | 10/2014 | Sharon | |
| 8,892,274 B2 | 11/2014 | Baudry | |
| 2008/0091352 A1 | 4/2008 | O'Hare | |

(Continued)

FOREIGN PATENT DOCUMENTS

| | | |
|---|---|---|
| EP | 1770687 | 4/2007 |
| WO | 2009066109 | 5/2009 |

OTHER PUBLICATIONS

Healey et al., "Detecting Stress During Real-World Driving Tasks Using Physiological Sensors", Jun. 1, 2005, pp. 156-166, vol. 6, No. 2, Publisher: IEEE Transactions on Intelligent Transportation Systems, Published in: US.

(Continued)

*Primary Examiner* — John F Mortell
(74) *Attorney, Agent, or Firm* — Bookoff McAndrews, PLLC

(57) ABSTRACT

A system is disclosed for reducing the likelihood of vehicle accidents, particularly accidents involving large commercial vehicles, such as aircraft. The system includes one or more wearable electronic devices worn by a vehicle operator, such as a pilot. Physiological emotional data is measured by the wearable device(s) and transmitted to a computing cloud or other computing device for analysis and comparison with a predictive model for indicating the emotional state of the operator. When an unsafe emotional state is detected, an alarm notification is generated and transmitted to an appropriate group of users for resolution.

20 Claims, 6 Drawing Sheets

145

Pilot Emotional Dashboard

| Flight | Airlines | Pilot | Date/Time | CoPilot | Alarm_State | Emotional_State |
|---|---|---|---|---|---|---|
| BA0118 | Lufthansa | Ben | 08/10/15 01:59:00 | Suresh | Normal | OK |
| BA0119 | Lufthansa | Rojer | 08/10/15 01:59:10 | Chaemol | Alarm | Critical |
| BA0120 | Lufthansa | Tom | 08/10/15 01:59:08 | Verner | Normal | OK |
| BA0121 | Lufthansa | Edward | 08/10/15 01:59:25 | John | Normal | OK |

NaN - NaN of 4 items

Emotional Signatures
BPM : 80
Skin conductance : 20%
Finger Temperature : 10 deg. celcius
Cardiovascular activity : 40%

Emotional State
Severe Depression    NORMAL

Pilot    Co Pilot

Time to crash
19 Seconds

Panic Alarm — 405
Emotional Index 85%
Countdown
00:15:30
00:15:25

(56) References Cited

U.S. PATENT DOCUMENTS

| | | | |
|---|---|---|---|
| 2008/0231461 A1* | 9/2008 | Sanchez | B60K 28/066 340/575 |
| 2010/0087984 A1* | 4/2010 | Joseph | G09B 9/052 701/31.4 |
| 2012/0116186 A1 | 5/2012 | Shrivastav et al. | |
| 2012/0256768 A1* | 10/2012 | Kratchounova | G01C 23/00 340/973 |
| 2014/0222174 A1 | 8/2014 | Teller et al. | |
| 2014/0240132 A1* | 8/2014 | Bychkov | A61B 5/18 340/576 |
| 2015/0029014 A1 | 1/2015 | Bande Martinez et al. | |
| 2015/0123820 A1* | 5/2015 | Merle | A61B 5/18 340/945 |
| 2015/0161876 A1 | 6/2015 | Castillo | |
| 2015/0254955 A1* | 9/2015 | Fields | G08B 21/02 705/4 |
| 2015/0313476 A1 | 11/2015 | Pisani et al. | |
| 2016/0071393 A1 | 3/2016 | Kaplan et al. | |

OTHER PUBLICATIONS

Carter, "How mining human emotions could become the next big thing in tech", "http://www.in.techradar.com/news/world-of-tech/future-tech/Emotional-data-from-the-likes-of-the-Apple-Watch-is-this-the-next-boom/articleshow/46986056", Apr. 20, 2015, pp. 1-14, Publisher: TechRadar.

Lisetti, et al., "Using Noninvasive Wearable Computers to Recognize Human Emotions from Physiological Signals", "Hindawi Publishing Corporation", Apr. 14, 2004, pp. 1672-1687, Publisher: EURASIP Journal on Applied Signal Processing.

Miller, "Wearable Technology Gets Emotional", "http://health.usnews.com/health-news/health-wellness/articles/2015/07/09/wearable-technology-can-now-detect-your-emotions", Jul. 9, 2015, pp. 1-16, Publisher: U.S. News.

Sano, et al., "Stress Recognition using Wearable Sensors and Mobile Phones", "IEEE Computer Society", 2013, pp. 671-676, Publisher: Humaine Association Conference on Affective Computing and Intelligent Interaction.

* cited by examiner

Pilot Emotional Dashboard — 145

| Flight | Airlines | Pilot | Date/Time | CoPilot | Alarm_State | Emotional_State |
|---|---|---|---|---|---|---|
| BA0118 | Lufthansa | Ben | 08/10/15 01:59:00 | Suresh | Normal | OK |
| BA0119 | Lufthansa | Rojer | 08/10/15 01:59:10 | Chaemol | Alarm | Critical |
| BA0120 | Lufthansa | Tom | 08/10/15 01:59:08 | Verner | Normal | OK |
| BA0121 | Lufthansa | Edward | 08/10/15 01:59:25 | John | Normal | OK |

NaN - NaN of 4 items

Emotional Signatures

BPM : 80
Skin conductance : 20%
Finger Temperature : 10 deg. celcius
Cardiovascular activity : 40%

Emotional State

Severe Depression

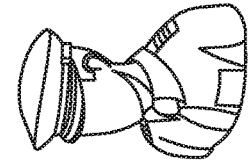

Pilot

NORMAL

Co Pilot

Time to crash

19 Seconds

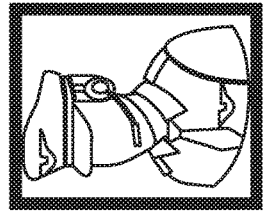

Panic Alarm
Emotional Index 85%
Countdown
00:15:30
00:15:25

SYSTEMS AND METHODS FOR RECOGNIZING AND ANALYZING EMOTIONAL STATES OF A VEHICLE OPERATOR

BACKGROUND

Members of modern society are confronted with a wide variety of circumstances that may diminish their mental and emotional well-being. For example, stress is a major problem in modern society. Sometimes people are aware of being under stress, whereas other times they are not. Some long-term conditions with high stress can be chronic, and people may be less likely to notice whether they are under high stress or may be generally less sensitive to stressors. Stress can impact all members of society, including those who operate large commercial vehicles, such as aircraft, buses, trucks, trains, ships, etc.

Vehicle accidents, particularly those involving large commercial vehicles, can result in catastrophic loss of lives and property. Such accidents can be caused by a variety of contributing factors, including the emotional state of the vehicle operator. For example, many plane crashes have been caused in part by pilot error, which is more likely to occur if the pilot is operating the aircraft in a compromised emotional state. In some cases, post-crash investigations have uncovered evidence that a pilot was suffering from stress, depression, mental illness, sleeplessness, fatigue, or other diminished capacities. Because vehicle accidents can be quite devastating, it is desirable to minimize the likelihood of an accident using every means possible.

SUMMARY

In one embodiment, a system comprises a vehicle configured to be operated by one or more operators, and one or more sensors configured to measure physiological emotional data indicating an emotional state of the operator(s) during operation of the vehicle. The system further comprises a transceiver in communication with the sensor(s) and configured to transmit the physiological emotional data to a computing cloud or other computing device, and an analysis module in communication with the transceiver and the computing cloud or other computing device, the analysis module being configured to receive the physiological emotional data, compare it against one or more preexisting patterns, and generate an alarm if a selected condition is satisfied.

The vehicle may comprise an aircraft, and the operators may include a pilot and a co-pilot. The one or more sensors may comprise one or more wearable electronic devices. The physiological emotional data may comprise skin conductance, electromyography data, finger temperature, cardiovascular activity, blood volume pulse, systolic blood pressure, diastolic blood pressure, pulse transit time, pulse volume amplitude, or other measurable indicator. The emotional state of the operator(s) may comprise one or more of the following states: fearful, frustrated, relaxed, joyful, or excited. The emotional state of the operator(s) may further comprise drunkenness, sleepiness, or other emotional states.

The system may further comprise a dashboard showing the emotional states of a plurality of operators using the system at a given time. The preexisting patterns may be stored in the computing cloud or other computing device and may comprise physiological emotional data regarding a plurality of operators using the system over time. The preexisting patterns may be updated periodically as physiological emotional data is collected from a plurality of operators. The analysis module may be configured to compute a relaxation score using a classification method, support vector machine, Fisher's linear discriminant, or another suitable method. The alarm may be selected from a group of alarms of differing severities, including a countdown to crash indicator and a man down indicator. The alarm may comprise one or more visual elements, audio elements, or haptic elements. The alarm may be broadcast to a plurality of users, together with information about the emotional state of the operator(s).

In another embodiment, a method comprises measuring physiological emotional data indicating an emotional state of one or more operators of a vehicle during operation of the vehicle, and transmitting the physiological emotional data to a computing cloud or other computing device. The method further comprises comparing the physiological emotional data against one or more preexisting patterns in the computing cloud or other computing device, and generating an alarm if comparing the physiological emotional data against one or more preexisting patterns results in a selected condition being satisfied.

The vehicle may comprise an aircraft, and the operators may include a pilot and a co-pilot. Measuring physiological emotional data may be performed by one or more wearable electronic devices worn by the vehicle operator(s). The physiological emotional data may comprise skin conductance, electromyography data, finger temperature, cardiovascular activity, blood volume pulse, systolic blood pressure, diastolic blood pressure, pulse transit time, pulse volume amplitude, or other measurable indicator. The emotional state of the operator(s) may comprise one or more of the following states: fearful, frustrated, relaxed, joyful, or excited. The preexisting patterns may be updated periodically as physiological emotional data is collected from a plurality of operators.

In another embodiment, a system comprises one or more vehicles, each vehicle being configured to be operated by one or more operators, each operator having a wearable electronic device with sensors capable of monitoring physiological data indicating an emotional state of the operator during operation of the vehicle. The system further comprises a control station in communication with the vehicle(s) via a communication module, the control station comprising a dashboard configured to show the emotional states of the operators operating the vehicle(s), and a computing cloud or other computing device in communication with the control station and having a cloud node located on-board the vehicle. The computing cloud or other computing device is configured to collect emotional score data from a plurality of vehicle operators and compile an emotional score database over time, the database being configured to generate predictive models for unsafe emotional states. The control station is configured to generate a suitable alarm signal when an unsafe emotional state is detected.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 4 illustrates one exemplary embodiment of a dashboard indicating the emotional states of a plurality of vehicle operators;

Figure 1:
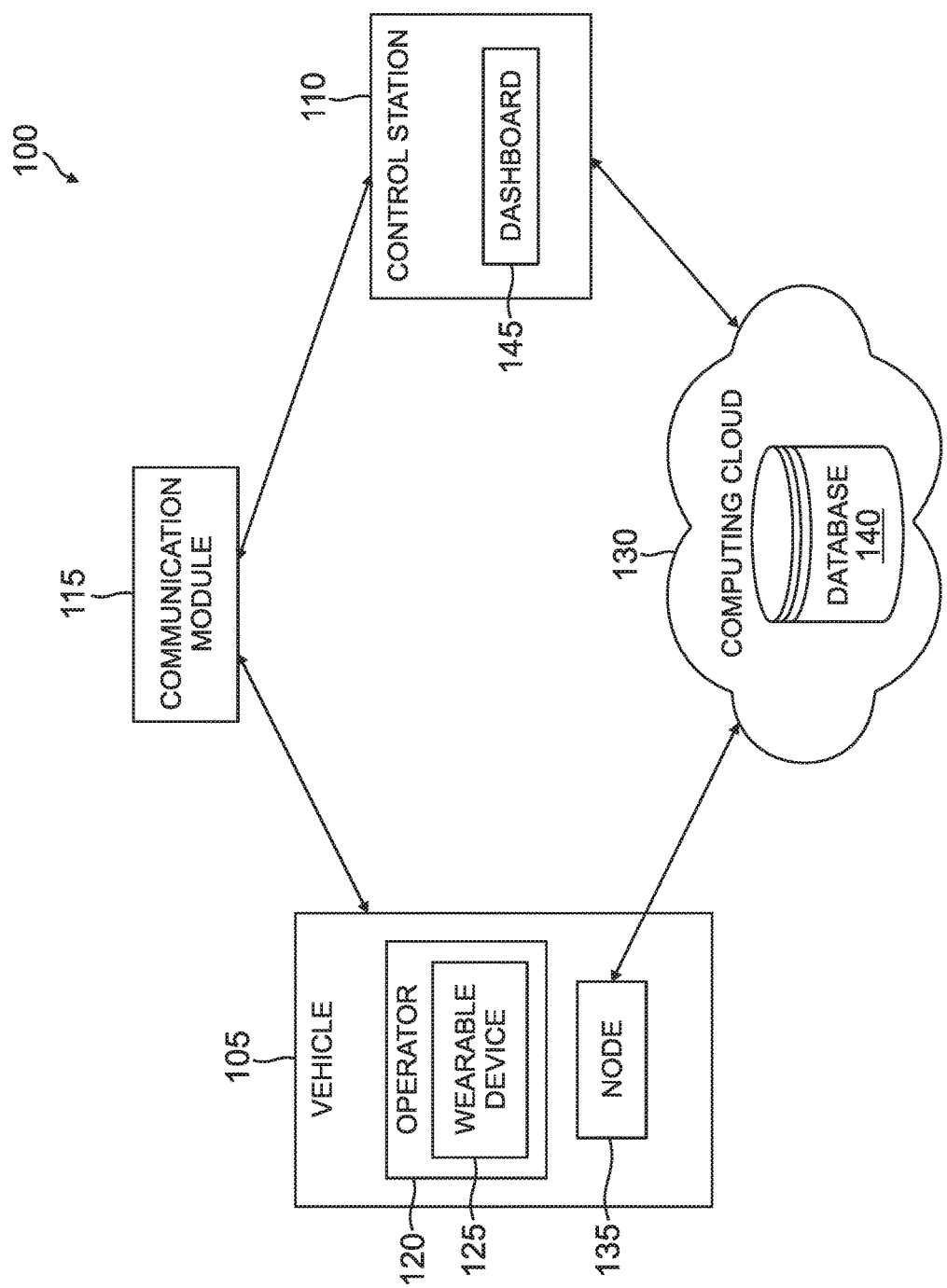
FIG. 1 illustrates one embodiment of a system for monitoring the emotional state of a vehicle operator.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 illustrates one embodiment of a system 100 for monitoring the emotional state of a vehicle operator. In the illustrated embodiment, the system 100 comprises a vehicle 105 in communication with a control station 110 via a suitable communication module 115, such as one or more satellites. In some cases, the vehicle 105 comprises an aircraft, whereas in other cases, the vehicle 105 may comprise a variety of other suitable vehicles, such as a bus, truck, train, ship, etc. For illustrative purposes, the system 100 will be described primarily in the context of an aircraft in the present application.

The communication module 115 may send and receive communications signals to and from the vehicle 105 and the control station 110 using a variety of suitable communications protocols, such as, for example, TCP IP and UDP. In some embodiments, the communications links between the vehicle 105, communication module 115, and control station 110 comprise IP over Satellite (IPoS) links.

The vehicle 105 includes one or more operators 120, such as pilots, co-pilots, etc., each having a wearable electronic device 125 with sensors capable of monitoring physiological data indicating an emotional state of the operator 120 during operation of the vehicle 105. The wearable electronic device(s) 125 may comprise a variety of suitable devices, such as, for example, smart watches with sensors capable of measuring one or more of the following parameters: skin conductance (e.g., galvanic skin response), electromyography data, finger temperature, cardiovascular activity, systolic and diastolic blood pressure, blood volume pulse, pulse transit time, pulse volume amplitude, etc.

Figure 2:
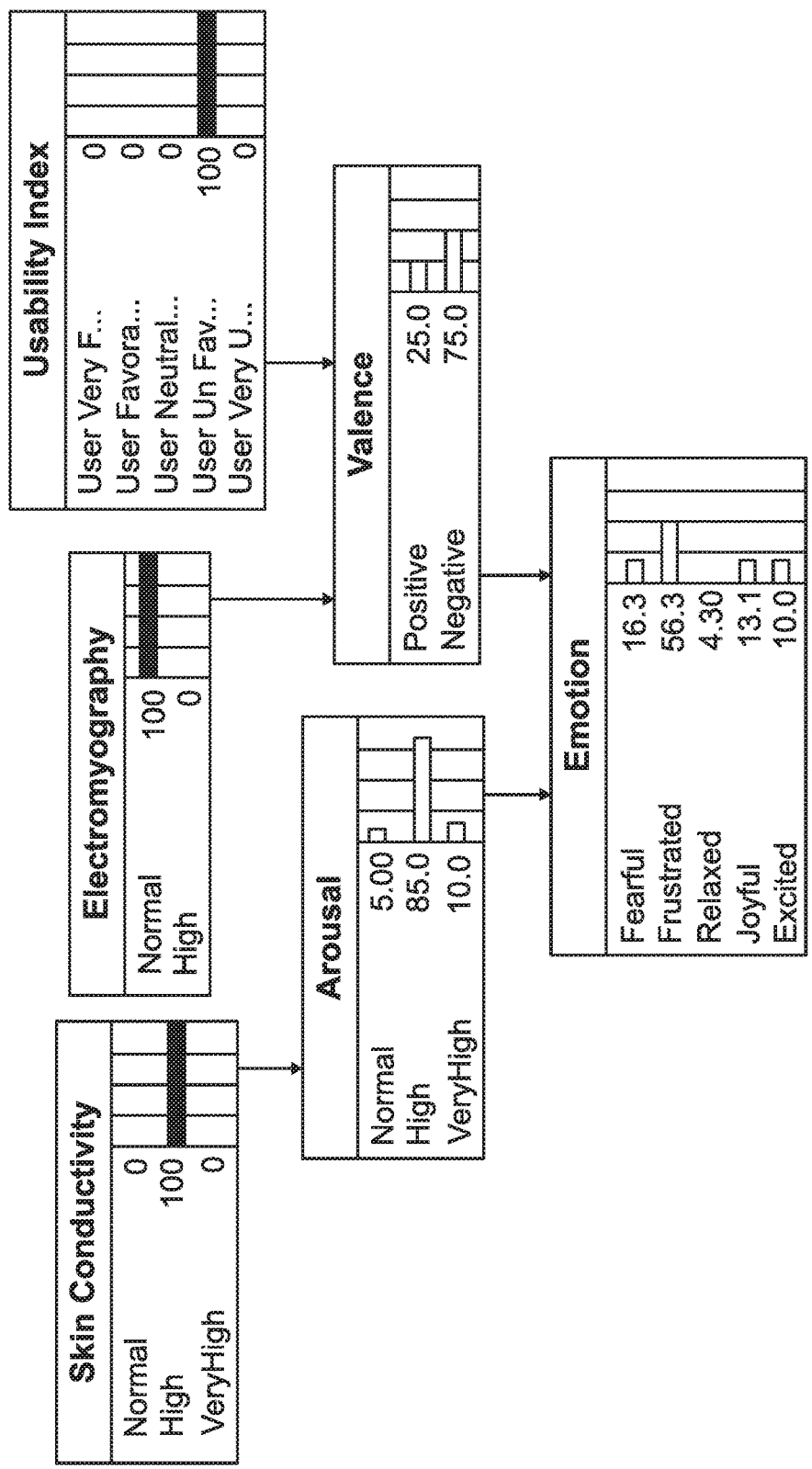
FIG. 2 illustrates one example of a relaxation score of a vehicle operator.

In operation, the sensor data can be used to compute a relaxation score or mental health quotient of the operator 120, an example of which is shown in FIG. 2. The relaxation score can be computed using a variety of suitable algorithms, such as a classification method, support vector machine, Fisher's linear discriminant, etc. A relaxation score may comprise one of the following five standard stress levels: (1) fearful, (2) frustrated, (3) relaxed, (4) joyful, (5) excited. In addition, a relaxation score may comprise one or more extended emotional states, such as, for example, drunkenness, sleepiness, etc.

Figure 3:
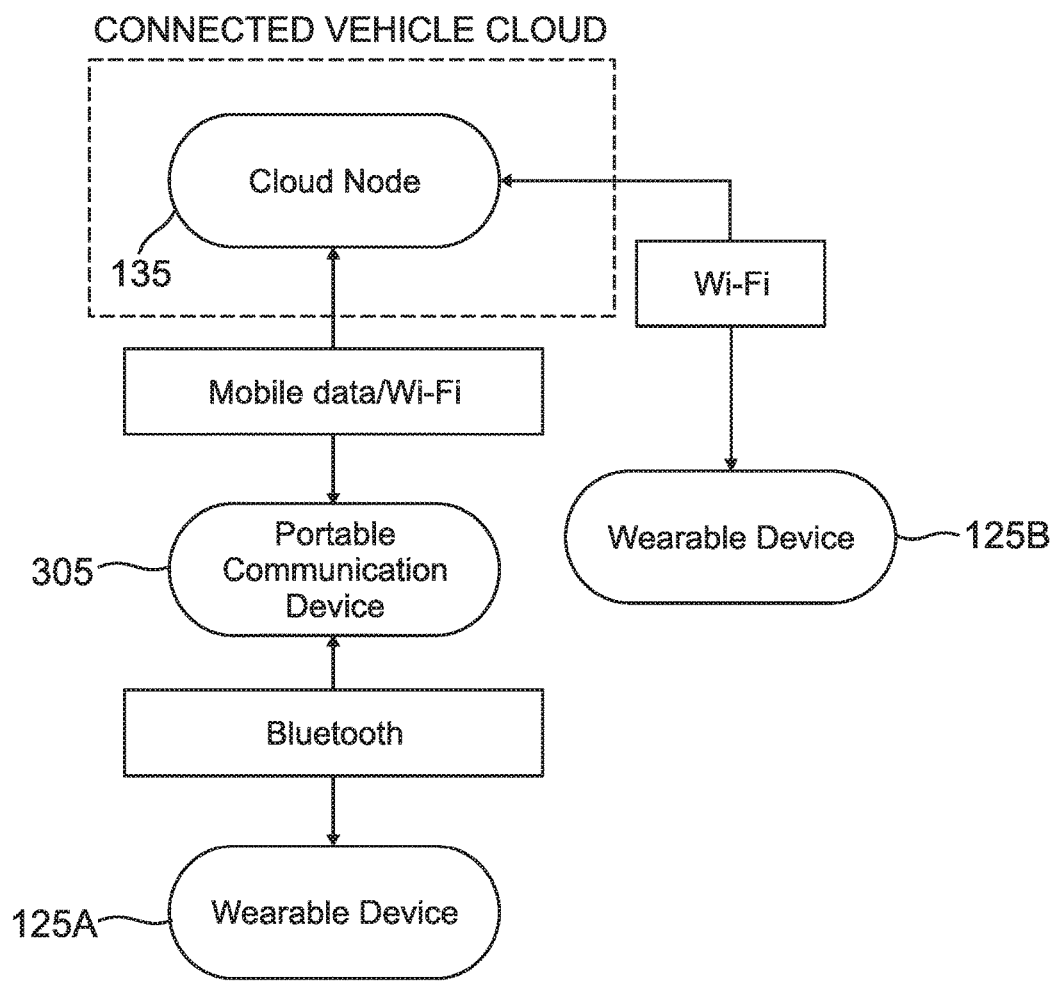
FIG. 3 illustrates one example of a plurality of wearable devices in communication with a cloud node on-board a vehicle.

As shown in FIG. 1, the system 100 further comprises a computing cloud 130 in communication with the control station 110 and having a cloud node 135 located on-board the vehicle 105. In other embodiments, computing cloud 130 is implement as another appropriate type of computing device. For simplicity, element 130 is referred to herein as "computing cloud 130." FIG. 3 illustrates one example of a plurality of wearable electronic devices 125 in communication with a cloud node 135 on-board a vehicle 105 when the vehicle is connected to the Internet, such as in the Connected Aircraft domain. In the illustrated example, a first wearable device 125A is in communication with a portable communication device 305, such as a mobile phone, via a Bluetooth communication link. The portable communication device 305, in turn, is in communication with the cloud node 135 via a mobile data or Wi-Fi communication link. A second wearable device 125B is in communication directly with the cloud node 135 via a Wi-Fi communication link. A variety of other suitable configurations and communications protocols are possible beyond the examples shown in FIG. 3.

Referring again to FIG. 1, in operation, the computing cloud 130 collects emotional score data from a plurality of vehicle operators 120, and compiles an emotional score database 140 over time. The database 140 of emotional score data can be used to generate predictive models for unsafe emotional states, which can be correlated to the data measured by sensors of the wearable devices 125 worn by the vehicle operators 120.

The control station 110 includes a dashboard 145 showing the emotional states of the operators 120 operating vehicles 105 in the system 100 at a given time. FIG. 4 illustrates one exemplary embodiment of such a dashboard 145. In operation, the control station 110 can receive relaxation score data from the vehicle 105 via the communication module 115 while the vehicle 105 is in transit, and for a selected time period before and after the vehicle's transit, if desired. For example, the control station 110 may receive relaxation score data during a pre-flight routine before an aircraft takes off.

Using the predictive models of the computing cloud 130, the control station 110 can advantageously determine when a vehicle operator 120 exhibits symptoms indicating he or she is in an unsafe emotional state, which can be displayed on the dashboard 145, as shown in FIG. 4. When such an unsafe emotional state is detected, the control station 110 can generate a suitable alarm and transmit it to the affected vehicle operator 120 and others if needed, signaling a possible need for intervention. The alarm signal may comprise a variety of components configured to attract the attention of the recipient(s), including one or more visual elements, audio elements, haptic elements, etc.

In some cases, the dashboard 145 may display a "countdown to crash" timer 405 that is situationally aware of the position and environment of the vehicle 105, as well as the emotional state of the vehicle operator 120. Such a countdown to crash timer 405 can advantageously convey the severity and intensity of certain unsafe emotional states to personnel at the control station 110, complete with contextual information.

Figure 5:
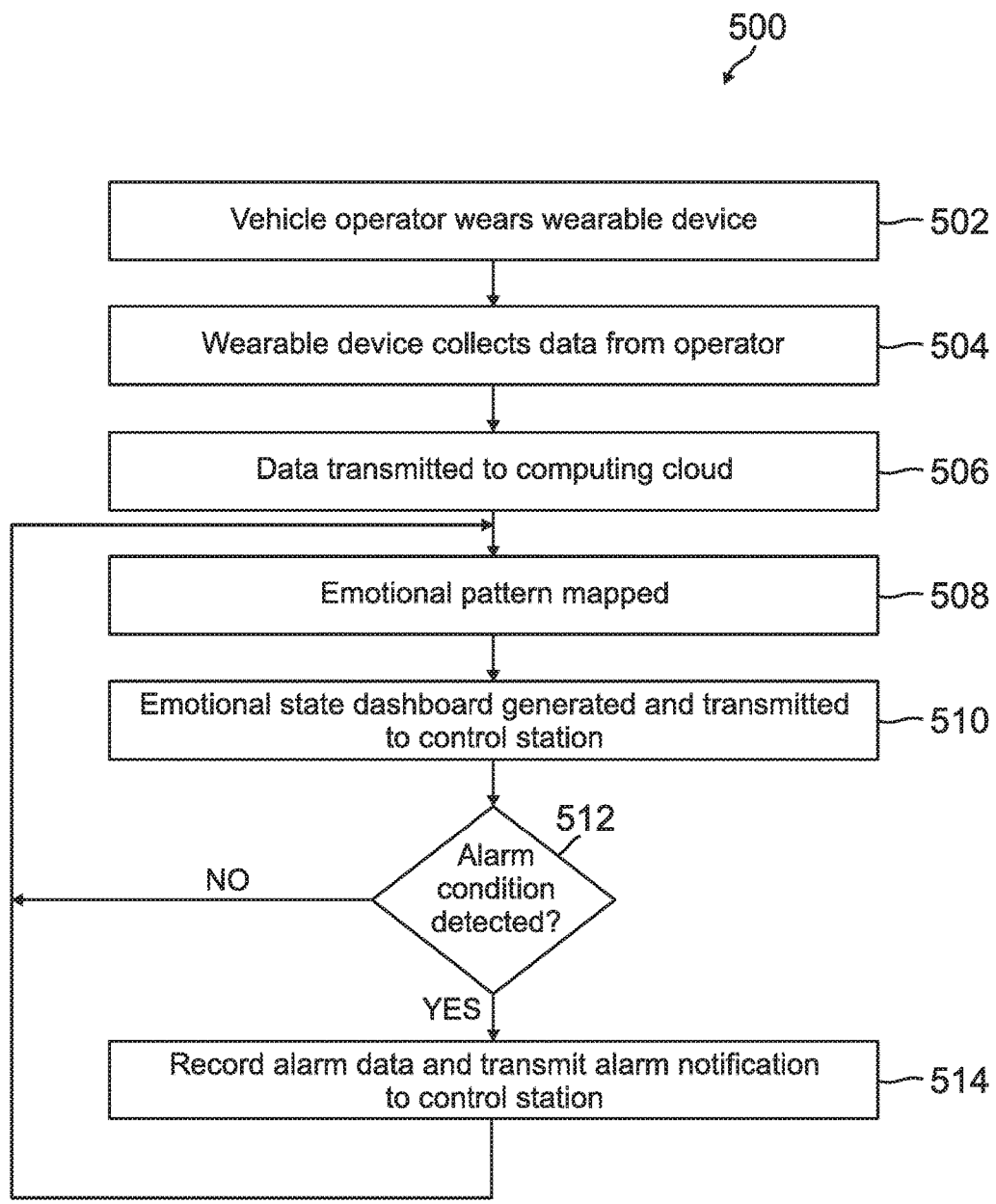
FIG. 5 illustrates one example of a method for processing data regarding an operator's emotional state.

FIG. 5 illustrates one example of a method 500 for processing data regarding an operator's emotional state. At a first block 502, a vehicle operator wears one or more wearable devices with sensors capable of monitoring physiological data indicating an emotional state of the operator, as described above. At block 504, the wearable device collects physiological data from the vehicle operator. At block 506, the physiological data is transmitted to a computing cloud or other computing device.

At block 508, the physiological data is mapped to an emotional pattern in the computing cloud or other computing device. At block 510, an emotional state dashboard is generated in the computing cloud or other computing device and transmitted to a control station, where control personnel can monitor the emotional state of the vehicle operator. At block 512, a determination is made as to whether a predetermined alarm condition exists by referencing the vehicle operator's emotional pattern against one or more predictive models in the computing cloud or other computing device. If not, processing returns to block 508, where the vehicle operator's emotional pattern continues to be updated with new data received from the wearable device(s). If an alarm condition is detected at block 512, processing continues to block 514, where the alarm data is validated and recorded in the computing cloud or other computing device, and an alarm notification is transmitted to the control station for further processing.

Figure 6:
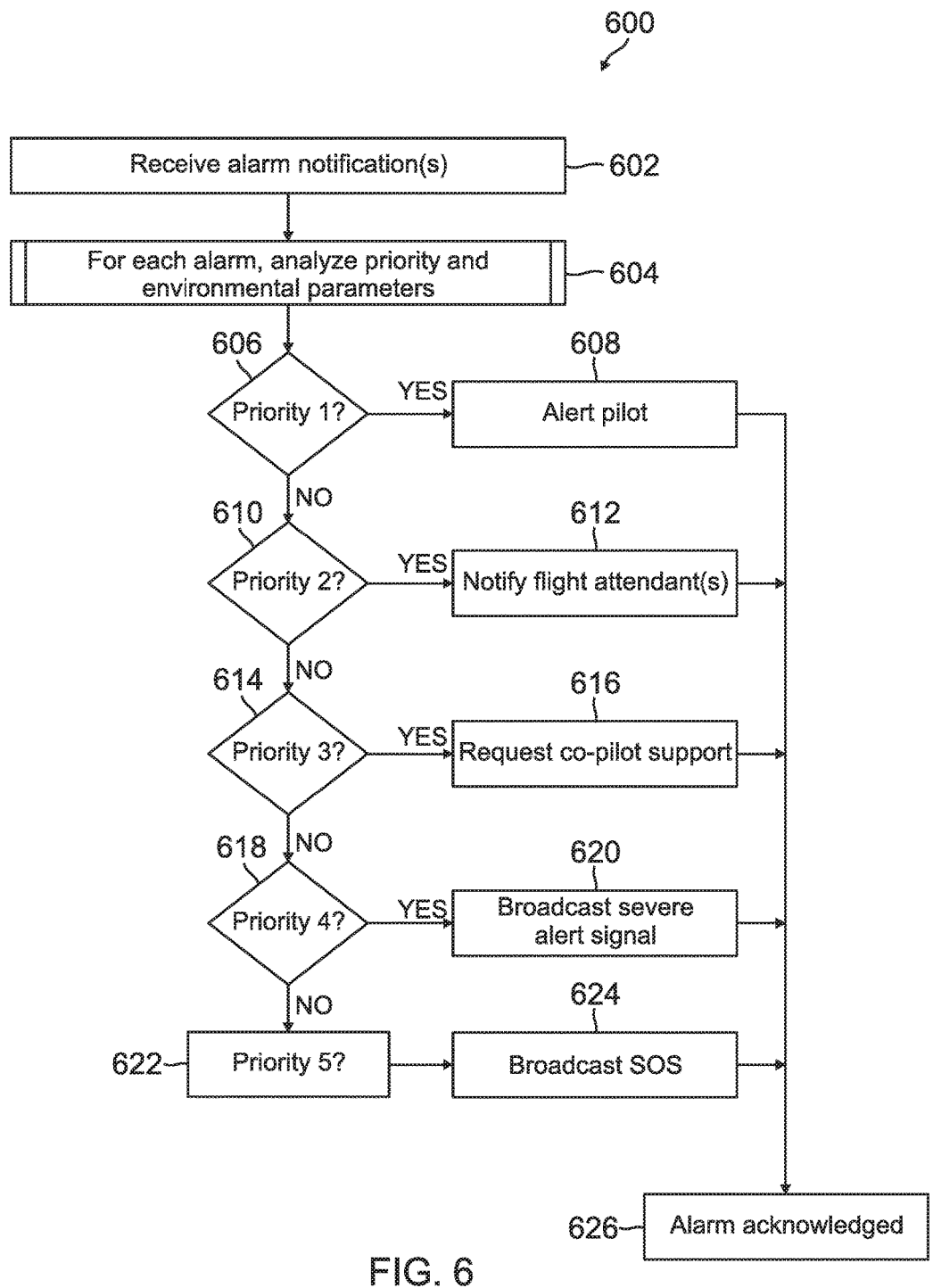
FIG. 6 illustrates one example of a method for processing alarm notifications.

FIG. 6 illustrates one example of a method 600 for processing alarm notifications. At a first block 602, a control station receives one or more alarm notifications from the computing cloud or other computing device. At block 604, the control station analyzes the priority of each alarm notification, together with the environmental parameters of the vehicle. For illustrative purposes, the exemplary method 600 shown in FIG. 6 includes five possible alarm priorities with corresponding response procedures in the context of an aircraft having a pilot, co-pilot, and one or more flight attendants. Other examples may include different numbers of possible alarm priorities and a variety of different response procedures.

In the illustrated example, at block 606, the control station determines whether the alarm meets the conditions corresponding to priority one, which is the least severe alarm priority in the example shown. If so, at block 608, the control station transmits an alert to the pilot for resolution. Then, at block 626, the control station receives an alarm acknowledgement signal.

If the alarm does not meet the conditions corresponding to priority one, processing continues to block 610, at which the control station determines whether the alarm meets the conditions corresponding to priority two, which is a more severe alarm priority. If so, at block 612, the control station transmits a notification to one or more flight attendants on-board the aircraft for resolution. Then, at block 626, the control station receives an alarm acknowledgement signal.

If the alarm does not meet the conditions corresponding to priority two, processing continues to block 614, at which the control station determines whether the alarm meets the conditions corresponding to priority three, which is a more severe alarm priority. If so, at block 616, the control station transmits a notification requesting support from the co-pilot for resolution. Then, at block 626, the control station receives an alarm acknowledgement signal.

If the alarm does not meet the conditions corresponding to priority three, processing continues to block 618, at which the control station determines whether the alarm meets the conditions corresponding to priority four, which is a more severe alarm priority. If so, at block 620, the control station broadcasts a severe alert signal to a central computing cloud or other computing device, together with information about the pilot's compromised emotional state. Then, at block 626, the control station receives an alarm acknowledgement signal.

If the alarm does not meet the conditions corresponding to priority four, processing continues to block 622, at which the control station determines that the alarm meets the conditions corresponding to priority five, which is the most severe alarm priority in the example shown. At block 624, the control station broadcasts an SOS signal to a plurality of control stations in communication with the central computing cloud or other computing device. Then, at block 626, the control station receives an alarm acknowledgement signal.

The systems and methods described above advantageously leverage the increasing sophistication of wearable devices and emotional pattern recognition to assist in reducing the likelihood of vehicle accidents, particularly catastrophic accidents involving large commercial vehicles, such as aircraft.

Although specific embodiments have been illustrated and described herein, it will be appreciated by those of ordinary skill in the art that any arrangement, which can achieve the same purpose, may be substituted for the specific embodiments shown. Therefore, it is manifestly intended that this invention be limited only by the claims and the equivalents thereof.

Example Embodiments

In one embodiment, a system comprises a vehicle configured to be operated by one or more operators, and one or more sensors configured to measure physiological emotional data indicating an emotional state of the operator(s) during operation of the vehicle. The system further comprises a transceiver in communication with the sensor(s) and configured to transmit the physiological emotional data to a computing cloud or other computing device, and an analysis module in communication with the transceiver and the computing cloud or other computing device, the analysis module being configured to receive the physiological emotional data, compare it against one or more preexisting patterns, and generate an alarm if a selected condition is satisfied.

The vehicle may comprise an aircraft, and the operators may include a pilot and a co-pilot. The one or more sensors may comprise one or more wearable electronic devices. The physiological emotional data may comprise skin conductance, electromyography data, finger temperature, cardiovascular activity, blood volume pulse, systolic blood pressure, diastolic blood pressure, pulse transit time, pulse volume amplitude, or other measurable indicator. The emotional state of the operator(s) may comprise one or more of the following states: fearful, frustrated, relaxed, joyful, or excited. The emotional state of the operator(s) may further comprise drunkenness, sleepiness, or other emotional states.

The system may further comprise a dashboard showing the emotional states of a plurality of operators using the system at a given time. The preexisting patterns may be stored in the computing cloud or other computing device and may comprise physiological emotional data regarding a plurality of operators using the system over time. The preexisting patterns may be updated periodically as physiological emotional data is collected from a plurality of operators. The analysis module may be configured to compute a relaxation score using a classification method, support vector machine, Fisher's linear discriminant, or another suitable method. The alarm may be selected from a group of alarms of differing severities, including a countdown to crash indicator and a man down indicator. The alarm may comprise one or more visual elements, audio elements, or haptic elements. The alarm may be broadcast to a plurality of users, together with information about the emotional state of the operator(s).

In another embodiment, a method comprises measuring physiological emotional data indicating an emotional state of one or more operators of a vehicle during operation of the vehicle, and transmitting the physiological emotional data to a computing cloud or other computing device. The method further comprises comparing the physiological emotional data against one or more preexisting patterns in the computing cloud or other computing device, and generating an alarm if comparing the physiological emotional data against one or more preexisting patterns results in a selected condition being satisfied.

The vehicle may comprise an aircraft, and the operators may include a pilot and a co-pilot. Measuring physiological emotional data may be performed by one or more wearable electronic devices worn by the vehicle operator(s). The physiological emotional data may comprise skin conductance, electromyography data, finger temperature, cardiovascular activity, blood volume pulse, systolic blood pressure, diastolic blood pressure, pulse transit time, pulse volume amplitude, or other measurable indicator. The emotional state of the operator(s) may comprise one or more of the following states: fearful, frustrated, relaxed, joyful, or excited. The preexisting patterns may be updated periodically as physiological emotional data is collected from a plurality of operators.

In another embodiment, a system comprises one or more vehicles, each vehicle being configured to be operated by one or more operators, each operator having a wearable electronic device with sensors capable of monitoring physiological data indicating an emotional state of the operator during operation of the vehicle. The system further comprises a control station in communication with the vehicle(s) via a communication module, the control station comprising a dashboard configured to show the emotional states of the operators operating the vehicle(s), and a computing cloud or other computing device in communication with the control station and having a cloud node located on-board the vehicle. The computing cloud or other computing device is configured to collect emotional score data from a plurality of vehicle operators and compile an emotional score database over time, the database being configured to generate predictive models for unsafe emotional states. The control station is configured to generate a suitable alarm signal when an unsafe emotional state is detected.

What is claimed is:

1. A system for recognizing and analyzing emotional states of a plurality of vehicle operators, comprising:
   one or more sensors configured to measure physiological emotional data indicating an emotional state of a plurality of operators of one or more vehicles;
   a transceiver in communication with the one or more sensors, the transceiver configured to transmit the measured physiological emotional data to a computing cloud or other computing device;
   an analysis module in communication with the transceiver and the computing cloud or other computing device, the analysis module being configured to:
      receive the measured physiological emotional data;
      compare the measured physiological emotional data against one or more preexisting patterns of stored physiological emotional data to determine the emotional state of each of the plurality of operators;
      generate an alarm if a selected condition is satisfied; and
      transmit the determined emotional states and generated alarms to a control station;
   a control station located off-board the one or more vehicles and in communication with each of the one or more vehicles via the computing cloud or other computing device, the control station configured to:
      receive the determined emotional states and generated alarms of each of the plurality of operators: and
      display, simultaneously on a dashboard, the emotional states and generated alarms of each of the plurality of operators using the system at a given time.

2. The system of claim 1, wherein the one or more vehicles comprise an aircraft and the plurality of operators include a pilot and a co-pilot.

3. The system of claim 1, wherein the one or more sensors comprise one or more wearable electronic devices.

4. The system of claim 1, wherein the physiological emotional data comprises skin conductance, electromyography data, finger temperature, cardiovascular activity, blood volume pulse, systolic blood pressure, diastolic blood pressure, pulse transit time, pulse volume amplitude, or other measurable indicator.

5. The system of claim 1, wherein the emotional state of the plurality of operators comprises one or more of the following states: fearful, frustrated, relaxed, joyful, excited, drunkenness, or sleepiness.

6. The system of claim 1, wherein the preexisting patterns of stored physiological emotional data are stored in the computing cloud or other computing device and comprise physiological emotional data regarding the plurality of operators using the system over time.

7. The system of claim 1, wherein the preexisting patterns of stored physiological emotional data are updated periodically as physiological emotional data is collected from the plurality of operators.

8. The system of claim 1, wherein the analysis module is configured to compute a relaxation score using a classification method, support vector machine, or Fisher's linear discriminant.

9. The system of claim 1, wherein the alarm may be selected from a group of alarms of differing severities, including a countdown to crash indicator and a man down indicator,
   wherein the countdown to crash indicator is situationally aware of a position and environment of each of the one or more vehicles and the emotional state of each of the plurality of operators.

10. The system of claim 1, wherein the alarm comprises one or more visual elements, audio elements, or haptic elements.

11. The system of claim 1, wherein the alarm is broadcast to a plurality of users, together with information about the emotional state of the plurality of operators.

12. A method for recognizing and analyzing emotional states of a plurality of vehicle operators, comprising:
   receiving, from one or more vehicles, measured physiological emotional data indicating an emotional state of a plurality of operators of the one or more vehicles;
   comparing the measured physiological emotional data against one or more preexisting patterns of stored physiological emotional data to determine the emotional state of each of the plurality of operators;

generating an alarm if comparing the measured physiological emotional data against the one or more preexisting patterns results in a selected condition being satisfied;

transmitting the determined emotional states and generated alarms of each of the plurality of operators to a control station located off-board the one or more vehicles, the control station comprising a dashboard for displaying simultaneously the emotional states and generated alarms of each of the plurality of operators simultaneously operating one of the one or more vehicles at a given time.

13. The method of claim 12, wherein the each of the one or more vehicles comprises an aircraft and the plurality of operators includes a pilot and a co-pilot.

14. The method of claim 12, wherein the physiological emotional data is measured by one or more wearable electronic devices worn by the each of the plurality of operators.

15. The method of claim 12, wherein the physiological emotional data comprises skin conductance, electromyography data, finger temperature, cardiovascular activity, blood volume pulse, systolic blood pressure, diastolic blood pressure, pulse transit time, pulse volume amplitude, or other measurable indicator.

16. The method of claim 12, wherein the emotional state of the plurality of operators comprises one or more of the following states: fearful, frustrated, relaxed, joyful, or excited.

17. The method of claim 12, wherein the preexisting patterns of stored physiological emotional data are updated periodically as physiological emotional data is collected from the plurality of operators.

18. A system for recognizing and analyzing emotional states of a plurality of vehicle operators, comprising:

a control station in communication with one or more vehicles via a communication module, the control station located off-board the one or more vehicles and comprising a dashboard configured to display simultaneously an emotional state of a plurality of operators, the plurality of operators each operating one of the one or more vehicles, wherein each of the plurality of operators having a wearable electronic device with sensors configured for monitoring physiological data indicating the emotional state of each of the plurality of operators during operation of the one or more vehicles; and a computing cloud or other computing device in communication with the control station and having a cloud node located on-board each of the one or more vehicles, wherein the computing cloud is configured to collect emotional score data from each of the plurality of operators and compile an emotional score database over time, the database being configured to generate predictive models for unsafe emotional states to determine the emotional state of the plurality of operators, wherein the control station is configured to generate and display a suitable alarm signal when an unsafe emotional state is detected for each of the plurality of operators.

19. The system of claim 18, wherein the suitable alarm signal comprises one or more alarm priorities with a corresponding response procedure for each of the one or more alarm priorities, the one or more alarm priorities being based on a severity of the emotional state of each of the plurality of operators.

20. The system of claim 19, wherein the one or more vehicles comprise an aircraft and the plurality of operators include a pilot and a co-pilot, and wherein the one or more alarm priorities comprises at least one of a priority one, a priority two, a priority three, a priority four, and a priority five, wherein if the one or more alarm priorities is priority one, the control station transmits an alert to the pilot for resolution, wherein if the one or more alarm priorities is priority two, the control station transmits a notification to one or more flight attendants, wherein if the one or more alarm priorities is priority three, the control station transmits a notification requesting support from a co-pilot for resolution, wherein if the one or more alarm priorities is priority four, the control station broadcasts a severe alert signal to the computing cloud or other computing device, together with information about the compromised emotional state of the pilot, wherein if the one or more alarm priorities is priority five, the control station broadcasts an "SOS" signal to a plurality of control stations in communication with the computing cloud or other computing device.

* * * * *